United States Patent [19]

Nagano

[11] Patent Number: 4,679,683

[45] Date of Patent: Jul. 14, 1987

[54] CLUTCH COVER ASSEMBLY

[75] Inventor: Tamio Nagano, Hirakata, Japan

[73] Assignee: Kabushiki Kaisha Daikin Seisakusho, Osaka, Japan

[21] Appl. No.: 752,425

[22] Filed: Jul. 8, 1985

[30] Foreign Application Priority Data

Jul. 9, 1984 [JP] Japan ............................ 59-104268[U]

[51] Int. Cl.⁴ ............................................ F16D 13/50
[52] U.S. Cl. ................................ 192/89 B; 192/70.27
[58] Field of Search ................... 192/70.27, 70.28, 89 B

[56] References Cited

U.S. PATENT DOCUMENTS 4,211,315 7/1980 Fenart ............................... 192/70.27

FOREIGN PATENT DOCUMENTS 2306255 8/1973 Fed. Rep. of Germany .... 192/89 B
1213918 11/1970 United Kingdom .............. 192/89 B
1549247 7/1979 United Kingdom .............. 192/89 B Primary Examiner—Rodney H. Bonck
Assistant Examiner—David A. Testardi
Attorney, Agent, or Firm—Armstrong, Nikaido Marmelstein & Kubovcik

[57] ABSTRACT

A clutch cover assembly, pin openings being provided on a diaphragm spring separately from tab openings, pins being fitted in the pin openings in such a manner as to be axially slidable and without play in a circumferential direction, and base portions of the pins being fixed to pin tabs on an inner peripheral part of a clutch cover body.

5 Claims, 3 Drawing Figures

CLUTCH COVER ASSEMBLY

BACKGROUND OF THE INVENTION

1. Industrial Useful Field

This invention relates to a clutch cover assembly for use in a diaphragm spring type friction clutch suitable for an automobile and similar vehicles.

2. Prior Art

Generally, in this type of a clutch a pair of wire rings are provided on both sides of a diaphragm spring for urging a pressure plate into contact with a clutch disk. The wire rings form a supporting point for the diaphragm spring. Further, a structure is widely used, in which the wire rings are supported by tabs provided at an inner periphery of a clutch cover.

However, because the tabs are extended through openings (expanded portions of radial slits) of the diaphragm spring to a pressure plate side, circumferential clearances are produced between tab side edges and spring circumferential end faces of the openings. Therefore, it is inevitable in a conventional clutch that the diaphragm spring rotates relatively to the clutch cover and the following disadvantages arise.

Namely, the clutch cover rotates together with an engine flywheel and, generally, the diaphragm spring also rotates together with the clutch cover. Because a release bearing obstructs or restrains the rotation of the diaphragm spring, in the event when a seizure is produced between an inner peripheral part of the diaphragm spring and the release bearing, the diaphragm spring rotates relatively to the clutch cover by a length corresponding to the clearance and the tab side edge collides against the opening end face of the diaphragm spring. Consequently, the diaphragm spring moves out of position and cuts into the tab. The diaphragm spring does not functioning smoothly and the releasing efficiency of the clutch fluctuates. The specified clutch operation characteristic is not obtainable. Further, in an extreme case, an early breakage of the diaphragm spring is induced.

OBJECT OF THE INVENTION

An object of the present invention is to provide a clutch cover assembly of a type wherein wire rings for a supporting point of a diaphragm spring are supported by tabs provided on a clutch cover and to ensure locking of rotation of the diaphragm spring with a simple and low-cost structure, thereby allowing the diaphragm spring to always function smoothly, maintaining an excellent clutch releasing characteristics and improving a durability of the clutch.

STRUCTURE OF THE INVENTION

In the instant invention, a clutch cover assembly, in which plural tabs are provided at an inner peripheral part of a clutch cover body with spaces provided therebetween in a clutch circumferential direction. The tabs are extended to a pressure plate side through tab openings of the diaphragm spring, and a pair of wire rings for supporting point are disposed on both sides of the diaphragm spring and supported by bent tabs. The cover assembly is characterized in that pin openings are provided on the diaphragm spring and pins are fitted in the pin openings in a slidable manner and without plays in the clutch circumferential direction. The base portions of the pins are fixed to the inner peripheral part of the clutch cover body.

DETAILED DESCRIPTION OF THE INVENTION

Figure 1:
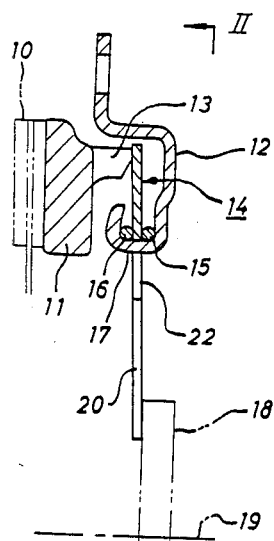
FIG. 1 is a vertical sectional view of a clutch cover assembly according to this invention.

In FIG. 1, a pressure plate 11 for pressing a clutch disk 10 is covered by a clutch cover body 12 from an outer peripheral side and a back side (right side of FIG. 1). Outer peripheral part of the clutch cover body 12 is fixed to a flywheel (not shown) of an engine. The pressure plate 11 has a projection 13 at its back face. An outer peripheral part of an annular diaphragm spring 14 contacts the projection 13. A pair of wire rings 15 & 16 contact opposite faces of the diaphragm spring 14. The wire rings 15 & 16 form a supporting point of the diaphragm spring 14, and are supported by tabs 17 of the clutch cover body 12 from an inner peripheral side and a side opposite to the diaphragm spring 14. A release bearing 18 faces against an inner peripheral part of the diaphragm spring 14 from a side opposite to the pressure plate 11. The release bearing 18 is provided slidingly onto an output shaft 19 (only its center line being shown) and connected through a link mechanism, not shown, to a clutch pedal.

Figure 2:
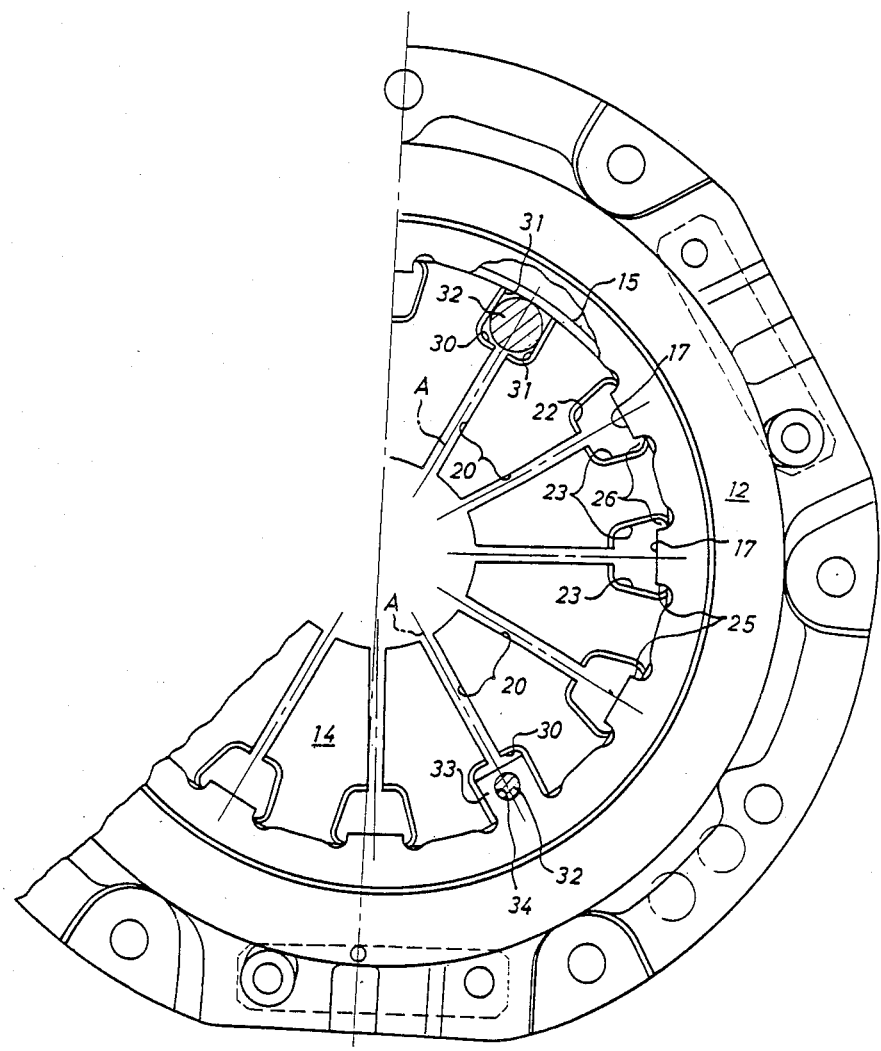
FIG. 2 is a partially fragmental partial view taken on a line II—II of FIG. 1.

As shown in FIG. 2, the diaphragm spring 14 has a radial slits 20 extending from its inner peripheral edge to a part near to an outer periphery. The outer peripheral portion beyond the ends of slit 20 is annularly continuous. Wire rings 15 & 16 contact an inner peripheral part of the annular continuous portion of the diaphragm spring 14 (FIG. 1). A radial outside end portion of the slit 20 (FIG. 2) is expanded in the circumferential direction to be formed into a roughly oval-shaped tab opening 22. Tab 17 is provided integrally with an inner peripheral edge of the clutch cover 12 and extends through corresponding tab opening 22 in diaphragm spring 14 to the pressure plate 11 side of spring 14, as shown in FIG. 1. A pressure plate 11 side end of the tab 17 is bent toward the outer peripheral side, thereby holding the wire rings 15 & 16 at approximately concentrical positions with the output shaft 19.

As shown in FIG. 2, tab opening 22 in diaphragm spring 14 is formed by bending with the opening facing clutch cover 12 (right side in FIG. 1) smaller than the opening facing pressure plate 11 (left side in FIG. 1). The circumferential end face 23 of the tab opening 22 extends approximately in the radial direction of the diaphragm spring 14. A circumferential clearance 26 is formed between a circumferential side edge 25 of the tab 17 and the end face 23 adjacent thereto.

Slits 20 of diaphragm spring 14 extend radially from tab openings 22 and are therefore disposed with approximately equal spaces therebetween in the clutch circumferential direction. The radial outer ends of selected slits 20 are expanded in the circumferential direction are formed into approximately square shaped pin openings 30 at three places on the of diaphragm spring 14 in alignment with circumference tab opening 22. The tab openings 22 and the pin openings 30 are disposed and spaced equally in the circumferential direction. The pin opening 30 facing clutch cover 12 (right side in FIG. 1) is smaller than the opening facing pressure plate 11 (left side in FIG. 1). The end faces 31 of the pin openings 30 are parallel with a central line A between both end faces 31. The central line A conformes with a central line of the slit 20 connected to the pin opening 30 and further with the radial direction of the diaphragm spring 14.

A roughly cylindrical pin 32 extending approximately in parallel with the clutch center line fits in the pin opening 30. The diameter of the pin 32 is equal to the space between the end faces 31 of the pin opening 30. Accordingly, the pin 32 has no play in the clutch circumferential direction within the pin opening 30 so that it fits in the pin opening 30 in such a manner as to be slidable in the clutch radial direction and the clutch center line direction. On the other hand, a pin tab 33 projecting to a clutch radial inner peripheral side is integrally provided at an inner peripheral part of the clutch body 12 as shown in FIG. 1. Pin tab 33 is formed at a position facing against the pin opening 30 viewing in parallel with the clutch center line. The pin tab 33 has an approximately rectangular shape and a hole 34 is formed at its center. A small base portion 35 of the pin 32 fits in the hole 34 from an inside of the clutch cover body 12 and is locked by swaging at an outside of the clutch cover body 12. Pin 32 is fixed to the clutch cover body 12 in such a position that a clutch outer peripheral side end face of the pin 32 can guide the wire rings 15 & 16 at their inner peripheral sides.

FUNCTION OF THE INVENTION

In FIG. 1, under a clutch engaging state the diaphragm spring 14 presses the pressure plate 11 to the clutch disk 10 side, and the pressure plate 11, in turn, presses a facing of the clutch disk 10 to the not-shown flywheel. When disengaging the clutch, a clutch pedal is depressed and the release bearing 18 presses an inner peripheral part of the diaphragm spring 14 to the pressure plate 11 side. Through this operation the diaphragm spring 14 releases the pressing force against the pressure plate 11, and the pressure plate 11, in turn, releases the pressing force against the clutch disk 10. In either of these engaging state or disengaging state, the clutch cover body 12 rotates together with the flywheel, and the diaphragm spring 14 and the wire rings 15 & 16 always rotate together therewith.

In the event a seizure is produced between the release bearing 18 and the inner peripheral part of the diaphragm spring 14 under the above-mentioned operational state, a force opposing rotation is applied from the release bearing 18 to the diaphragm spring 14. Since the pin 32 fits without clearance in between the end faces 31 (FIG. 2) of the diaphragm spring 14, the diaphragm spring 14 does not rotates relatively to the clutch cover body 12 and the diaphragm spring 14 does not collide violently against the tab 17 or the pin 32 due to relative rotation in the circumferential direction. Because relative rotation and the collision is avoided, the diaphragm spring 14 and the wire rings 15 & 16 do not deviate from normal positions and the spring does not cut into the tab etc.

As mentioned above, in case when the circumferential force is applied from the release bearing 18 to the diaphragm spring 14, the pin 32 presses on the end faces 31 of the pin opening 30. However, because the pin 32 presses at its cylindrical outer peripheral surface on the pin opening 30 of the diaphragm spring 14, abnormal wear or cut-in is not produced on pressing parts of the end face 31 and the pin 32. Further, contacting area of the end face 31 and the pin 32 is large because the end face 31 is smaller at the side facing clutch cover body 12 than at the side facing pressure plate 11. The cut of the diaphragm spring 14 into the pin 32 can further be avoided.

EFFECT OF THE INVENTION

The following advantages are obtainable:

(a) Locking of rotation of the diaphragm spring 14 relative to the clutch cover body 12 is ensured, the diaphragm spring 14 can be positioned correctly, and the cut of the diaphragm spring 14 into the tab 17 can be avoided.

(b) Since compression and elongation of the diaphragm spring 14 are always smooth, the clutch releasing efficiency becomes stable and the specified clutch operation characteristic can be obtained for a long period.

(c) Possibility of early breakage of the diaphragm spring 14 can be securely eliminated, and a marked improvement in its durability can be expected.

(d) The structure is simple and of low-cost.

Figure 3:
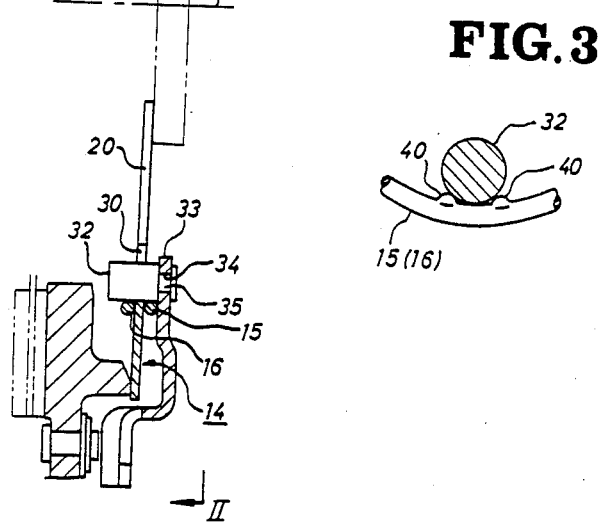
FIG. 3 is a vertical sectional partial view of another embodiment.

ANOTHER EMBODIMENT (a) As shown in FIG. 3, the wire ring 15(16) may be provided with crimps comprising two integrally formed projections 40 projecting to the pin 32 side at positions for holding the pin 32, so that the wire ring 15 (16) may be prevented from rotating. Thus, abnormal sound from the wire ring 15 (16) can be controlled and acceleration of wear of the wire ring 15 (16) can be avoided.

(b) The pin 32 and the pin tab 33 are not necessarily be provided at three places, but may be provided at two or more places. It is necessary to maintain balance by disposing the pins 32 and pin tabs 33 at the same intervals in the clutch circumferential direction.

(c) The pin 32 may be induction hardened to improve its strength for further secure prevention of the cut-in.

(d) The pin opening 30 is not necessarily be formed at the outer peripheral part of the slit 20. The tab opening 22 may be formed at the position of the pin opening 30 of FIG. 2, the pin opening 30 may be separately formed at another place (for example, at an outer peripheral side annular port) and the hole 34 may be provided at a position corresponding to the pin opening 30 of the clutch cover body 12, and the pin 32 fitting in the pin opening 30 may be fixed in the hole 34. It is desirable, from viewpoint of wear resistance, that the pin opening 30 and pin 32 are positioned close to the supporting point (position of the wire rings 15 & 16) of the diaphragm spring 14, because a sliding stroke of the pin 32 itself becomes small when the diaphragm spring 14 is actuated.

(e) When the tab 17, before being bent is formed into the identical shape with the pin tab 33, manufacturing of the clutch cover body 12 will become easy. Further, when the hole 34 is formed also on the tab 17, either projection may be chosen as the pin tab 33 in assembling the clutch cover. Thus, the assembling work will be further simplified.

(f) When the tab opening 22 is formed into the identical shape with the pin opening 30, either opening may be utilized as the pin opening 30 in assembling the clutch cover. Thus the assembling work will be simplified.

What is claimed is:

1. A clutch cover assembly comprising a clutch cover body and a diaphragm spring therein, said clutch cover body having an inner peripheral part, a plurality of diaphragm spring tabs on said clutch cover body at said inner peripheral part of said clutch cover body and having spaces therebetween in the circumferential direction of said inner peripheral part, said diaphragm spring tabs being bent inward of said clutch cover body and extending through tab openings in said diaphragm spring and extending radially outwardly at their inner end and a pair of wire rings disposed on said diaphragm spring tabs, one of said wire rings of said pair of wire rings being disposed on said diaphragm spring tabs between said clutch cover body and said diaphragm spring and the other of said wire rings of said pair of wire rings being disposed on the other side of said diaphragm spring between said diaphragm spring and said radially outwardly extending inner end of said diaphragm spring tabs, said diaphragm spring being between said wire rings, said diaphragm spring and said wire rings being supported by said diaphragm spring tabs; characterized by that pin opening are provided on the diaphragm spring adjacent the inner peripheral part of said clutch cover, said diaphragm spring tabs and said pair of wire rings, pins are fitted in said pin openings and extend through said diaphragm spring in such a manner that said diaphragm spring is slidable axially of said pins and without play in the circumferential direction of said diaphragm spring, and base portions of said pins are fixed to pin tabs at the inner peripheral part of said clutch cover body intermediate adjacent pairs of said diaphragm spring tabs and extending radially inwardly therebetween.

2. A clutch cover assembly as set forth in claim 1, in which said diaphragm spring has a plurality of equally spaced radial slits and the radial outer peripheral ends of said slits are expanded to form said tab openings and said pin openings.

3. A clutch cover assembly as set forth in claim 1, in which projections projecting radially inwardly toward said pins are formed on said wire rings for preventing said wire rings from rotating.

4. A clutch cover assembly as set forth in claim 1, in which said diaphragm spring has a plurality of equally spaced radial slits, radial outer peripheral ends of said slits are expanded to form said tab openings and said pin openings, and crimp projections are formed on said wire rings projecting radially inward toward said pins for preventing said wire rings from rotating.

5. A clutch cover assembly as set forth in any one of claim 1 through claim 4, in which circumferential end faces of said pin openings are formed in parallel with a central line between said end faces.

* * * * *